O. E. WEST.
DISTRIBUTING CHUTE.
APPLICATION FILED MAY 7, 1914.
1,145,952.
Patented July 13, 1915.
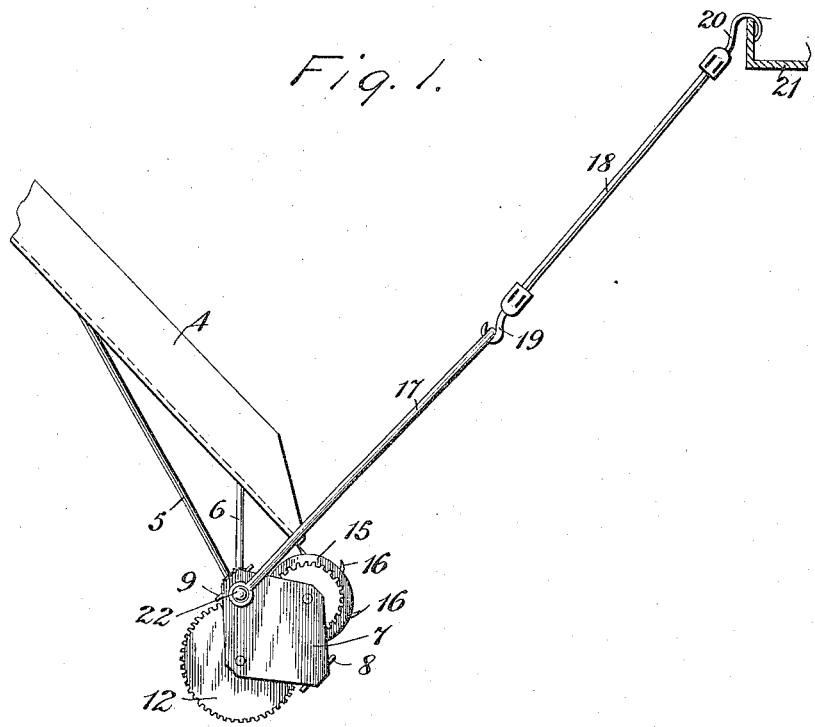
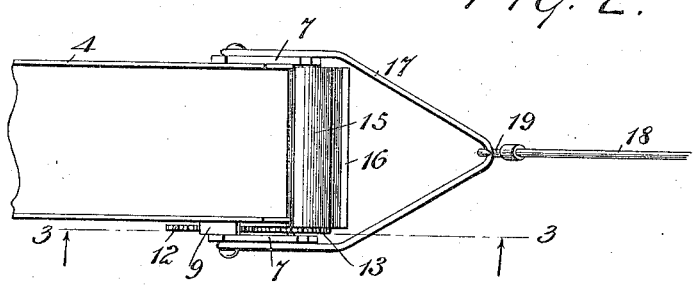
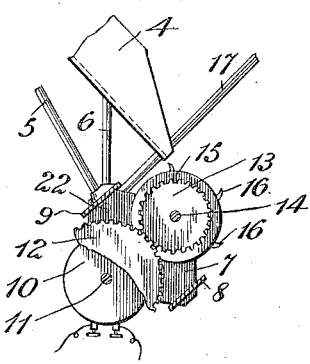
WITNESSES
INVENTOR
Oscar E. West
BY
ATTORNEYS

UNITED STATES PATENT OFFICE.

OSCAR EBBIE WEST, OF BRUNSWICK, GEORGIA.

DISTRIBUTING-CHUTE.

1,145,952.　　　　Specification of Letters Patent.　　Patented July 13, 1915.

Application filed May 7, 1914.　Serial No. 837,049.

*To all whom it may concern:*

Be it known that I, OSCAR E. WEST, a subject of the King of Great Britain, residing at Brunswick, county of Glynn, and State of Georgia, have invented certain new and useful Improvements in Distributing-Chutes, of which the following is a specification.

My invention relates to distributing chutes of the kind suitable for loading and unloading loose materials such as coal, phosphate rock and slate, the purpose of my device being to enable the material to be fed through the chute with a considerable degree of freedom, the chute and mechanism immediately associated therewith and practically constituting a part of the same taking care of the material as it passes through the chute.

My invention further comprehends a device of this kind in which the loose material is scattered broadcast from the chute, the mechanism required for this purpose being very simple and consisting of parts easily removed and replaced.

Reference is made to the accompanying drawings forming a part of this specification, and in which like letters indicate like parts.

Figure 1 is a side elevation of my improved distributing chute; Fig. 2 is a plan view of the same; Fig. 3 is a section on the line 3—3 of Fig. 2, looking in the direction of the arrow.

A chute section 4, having in this instance the form of a wide flat bottom trough, is provided with a pair of spider irons 5—6 disposed adjacent each of its bottom edges. Supported by these spider arms are two frame plates 7 connected together by spacing plates 8—9 extending practically the full width of the chute. A motor 10, which in this instance is an electric motor, is mounted rigidly between the frame plates 7 and is provided with a motor shaft 11. Mounted rigidly upon this shaft is a gear wheel 12, which meshes with another gear wheel 13, the latter being mounted rigidly upon a revoluble shaft 14. Mounted rigidly upon this shaft is a revoluble drum 15 carrying a number of striker blades 16 extending the full length of the drum—that is, extending practically the full width of the chute section 4. A bail 17 engages the frame plates 7 and extends obliquely upward therefrom. A tackle 18 is provided with a hook 19 which engages the bail 17, and with another hook 20, the latter engaging a beam 21 or equivalent. The framework, including the casing plates 7 and parts carried thereby, is mounted upon a pivot pin 22 to which the bail 17 is rigidly secured. By aid of the tackle 18 the chute section 4 and various parts carried by it may be moved into different positions, as will be understood from Fig. 1. The material to be distributed is fed freely, yet not too rapidly, down the chute section 4, and the distributing roller 15 being in action the striker blades 16 are moved around with great velocity. They strike the falling particles of loose material, and project them tangentially to a distance. The material is thus distributed evenly all over the floor of the vessel or room in which the device is operated.

By raising and lowering the end of the chute section 4, which is done by aid of the tackle 18, the rapidity of flow of the material may be regulated at will.

The body portion of the distributing roller 15 is preferably cast in a single piece, the striker blades being detachably mounted upon it.

The operation of my device is as follows:—The parts being assembled and arranged as above described, and power being applied to the motor 10, the various gear members are thrown into action and the distributing roller acquires a high degree of speed. The loose material being fed downwardly through the chute reaches the distributing roller, and is distributed as above described.

I do not limit myself to the precise construction shown, as variations may be made therefrom without departing from the spirit of my invention.

Having thus described my invention, what I claim as new and desire to secure by Letters Patent is as follows:—

1. In a distributing chute the combination of a chute section, a frame carried by and located below said chute section, a motor disposed within said frame, gearing connected with said motor and driven thereby, a distributing roller connected with said gearing and actuated by the same, said distributing roller having a high degree of speed, distributing blades carried by said distributing roller for striking pieces of loose material discharged from said chute section, so as to propel said pieces to a distance, and means for adjusting the position of the several parts.

2. A distributing chute comprising a chute section, spider arms carried thereby, frame plates supported by said spider arms, a motor mounted between said frame plates, gearing located between said frame plates and connected with said motor, a revoluble member connected with said gearing and driven thereby at a high speed, and a plurality of striker blades mounted upon said revoluble member for engaging loose material falling thereupon, and projecting said loose material to a distance.

3. A distributing chute comprising a movable chute section, spider arms connected thereto, a frame mounted upon said spider arms, a distributing roller journaled to said frame and adapted to turn, mechanism mounted within said frame and connected with said distributing roller for actuating the latter, and means connected with said frame for adjustably supporting the several parts.

4. In a distributing chute, a chute section, a frame carried by the said chute section below the discharge end thereof, a revoluble drum mounted in the frame and provided with longitudinally extending blades, a motor carried by the frame and geared with the distributer, and means for adjustably supporting the several parts.

In witness whereof, I have signed my name to this specification, in the presence of two subscribing witnesses.

OSCAR EBBIE WEST.

Witnesses:
M. B. MOORE,
A. M. WAY.

Copies of this patent may be obtained for five cents each, by addressing the "Commissioner of Patents, Washington, D. C."